(No Model.)

N. LOMBARD.
CAR BRAKE SYSTEM.

No. 523,436. Patented July 24, 1894.

Witnesses. Inventor.
Nathaniel Lombard.

UNITED STATES PATENT OFFICE.

NATHANIEL LOMBARD, OF BOSTON, MASSACHUSETTS.

CAR-BRAKE SYSTEM.

SPECIFICATION forming part of Letters Patent No. 523,436, dated July 24, 1894.

Application filed December 11, 1893. Serial No. 493,449. (No model.)

*To all whom it may concern:*

Be it known that I, NATHANIEL LOMBARD, a citizen of the United States, residing at Boston, in the county of Suffolk and State of Massachusetts, have invented certain new and useful Improvements in Car-Brake Systems; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a system for operating brakes, and consists in providing a system entirely closed, or in other words, a system which neither discharges into the air nor is subject to atmospheric influences.

My invention is embodied in a permanently closed system, which includes two vessels one for pressure and the other for vacuum service, together with mechanism by which the brake-beam is operated.

A further feature in my system is embodied in a pump or other liquid impelling agent, whereby the liquid employed as the active agent and contained in said system, after use and return to the vacuum vessel, is forced to enter the pressure reservoir in readiness for further service.

As before stated my system for operating brakes is preferably to contain some liquid, as oil, but water, alcohol or other liquids may be employed with equally efficient results. The chief characteristic, however, is embodied in the fact that the liquid impelling agent or pump, although in operation continuously, performs work only at short intervals which occur after the brake system has been operated.

The drawings accompanying this specification represent one form of a closed system for operating brakes as embodied in my invention.

Figure 1:
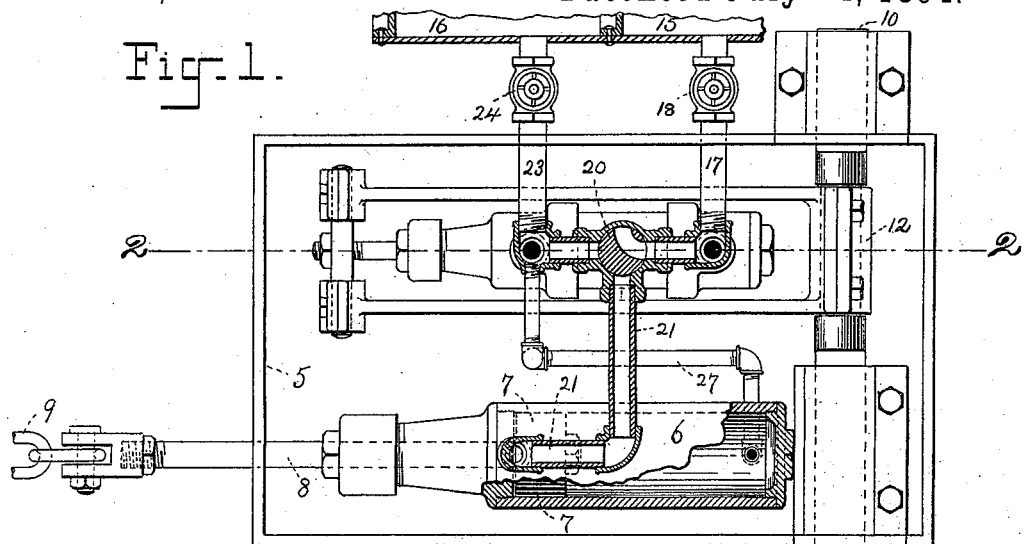
Figure 2:
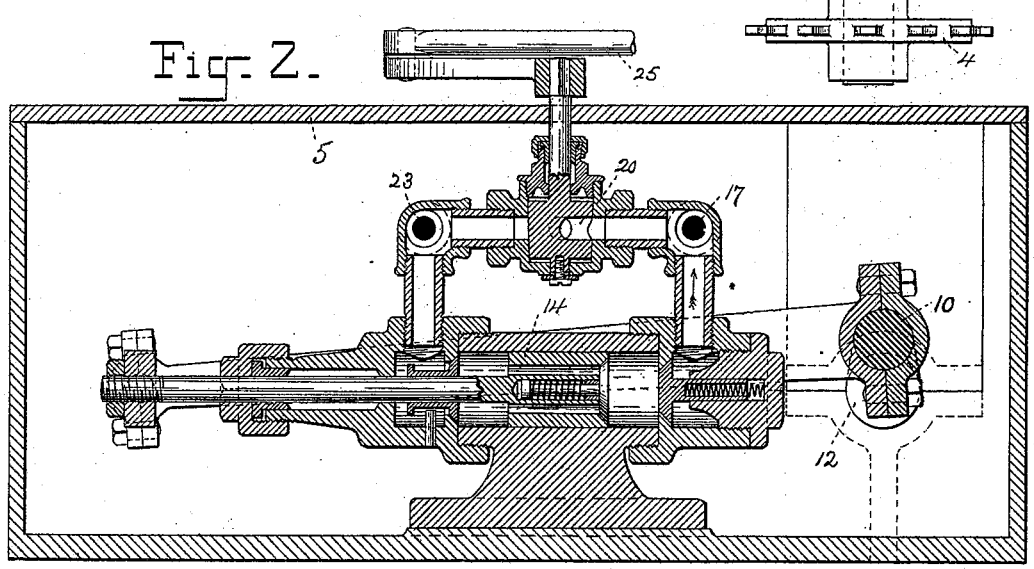
Figure 3:
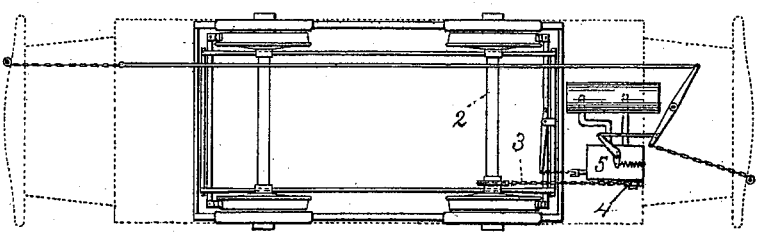
Figure 4:
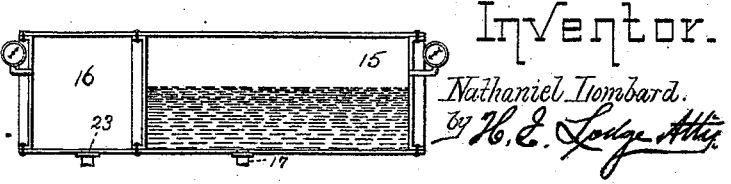

Figure 1 is a plan view of an apparatus adapted to operate under my system. Fig. 2 is a section of the liquid-forcing agent on line 2—2, Fig. 1. Fig. 3 is a diagram of the apparatus as applied to a car. Fig. 4 is a section of a tank for both vacuum and pressure service.

In said drawings the brake system is illustrated as adapted for street-car service, more particularly for that class operated by electricity.

To fully illustrate my invention I have indicated a car axle at 2 from which extends a chain 3 to engage a sprocket wheel 4 on a shaft 12. Within a metallic box 5, preferably closed and dust-proof, and which is affixed beneath the car body in any suitable manner, is placed a brake cylinder 6 in which is contained a piston 7, the piston rod 8 extending through the end of the box and being united by a brake chain 9 to the brake beam. Said cylinder 6 is placed longitudinally of the box by preference, while in parallelism therewith is a pump or other liquid-forcing mechanism. This latter is operated by means of the crank 10 on the shaft 12 on which the sprocket wheel 4 is mounted, said crank being connected to and serving to reciprocate the plunger 14 forming part of said pump.

In lieu of the above a train of gears may be employed; in fact divers mechanisms may be employed to operate the liquid-forcing agent from the car axle.

The operative agency by which the brake system is rendered effective in setting, or releasing the brakes consists in two air tight vessels 15, 16, respectively for pressure and vacuum service. In the present instance this agency appears in the form of a single cylinder subdivided into two chambers or reservoirs, for greater compactness of form.

From the pressure reservoir emerges a pipe 17 with a valve 18 which valve is to be used in case the pump is to be disconnected for repairs. In the operation of the apparatus the valve 18 is normally open to allow liquid stored in the chamber 15 to pass to the brake cylinder, but the said valve should be closed prior to disconnection of the pipe 17 to prevent the escape, and consequent wastage, of oil. The pipe 17 extends from said vessel 15 and terminates in a three way valve 20, and said pipe 17 also communicates with the pressure or discharge end of the pump. The valve 20 is united by a pipe 21 with the pressure end of the brake cylinder and enters the latter at such a point as to allow liquid pressure to be exerted on the brake piston in order that movement of the latter will act to set the brakes. Similarly from the vacuum vessel 16 leads a pipe 23 supplied with a valve 24; but this pipe enters the pump cylinder upon the opposite side of the plunger from the pipe 17, or on the suction side of the cylinder. Said pipe is furthermore extended and terminates in the three-way valve 20 before alluded to. Thus it will be readily understood that the pipe 21 serves, by the varying position of the three way valve, to subject the brake piston to the influence of pressure or vacuum.

The valve 20 may be operated by a lever 25 or other controlling device, and when the said valve is in the position shown in Fig. 1 the pipe 21 is closed to both the pressure and vacuum vessels. Such would be the usual position when it is desired to have the brake beam entirely free, or when no brake action is needed. In the operation of this system the pump is always in motion, being so maintained by the mechanism which interconnects it with the car axle. Furthermore it is to be assumed that the valve 24 is closed and the vacuum vessel is to be filled completely with the liquid to be employed. In the present instance oil for example is the operating agent. This vessel is now closed to external influences, or is hermetically sealed to prevent admission of air, and the valve 24 is opened, when the action of the pump will at once, or in a very short time, remove all the liquid from the reservoir 16 to the vessel 15. In this way a vacuum will be established in one and a high pressure created in the other vessel. The system is now in readiness for use. In fact it may be operated at any time so long as pressure exists in the vessel 15. If the brakes are now to be set the three way valve 20 is axially shifted until communication is established between the pipes 17 and 21, when liquid under pressure passes into the brake cylinder and moves the piston a certain distance. This movement, it is evident, may be controlled according to the amount of liquid allowed to pass into the brake cylinder. When the desired brake effect is established the valve 20 is closed, this brake effect is now continued while the valve remains closed, or it may be increased or it may be diminished. If the latter effect is desired and the brakes are to be released, the lever 25 is shifted until the pipes 23 and 21 are connected. In this event the liquid in the brake cylinder rushes into the vacuum vessel or chamber. This return of the liquid (which has been employed in setting the brakes) from the brake cylinder to the vacuum vessel or chamber is caused by the return of the brake beam and brakes to their normal positions. The brake beams and brakes are, in practice, ordinarily returned to and maintained in their normal positions by a spring or springs in order to hold the brake shoes away from the wheels, and this force is utilized to retract the brake piston. Such return movement of the brake piston ejects the oil from the brake cylinder, and as there is a vacuum in the chamber or vessel to which it returns it is evident that the force required for its return is only such as is necessary to cause the liquid to flow into the said vacuum vessel or chamber, which latter may be nearly on a level with the brake cylinder. As soon as this liquid enters the vacuum vessel or chamber the pump commences to return it to the pressure vessel or chamber. Hence it is evident that the pump, although continuously in motion, is idle as regards the transfer of liquid except immediately after the brakes have been set and released.

A small tube 27 connects with the end of the brake cylinder opposite to where the oil enters and is joined with the pipe 23 leading to the vacuum vessel. Hence any liquid which may leak through between the walls of the brake-cylinder and the piston is easily removed and thereby allows free action of said piston which otherwise might be obstructed or impeded.

From the above description of parts it is evident that under this closed system no loss of the operating liquid occurs and the pump is only required to perform a duty equal to an expenditure of force necessary to return to the pressure vessel such liquid as has been employed in setting the brakes. This, in fact, is insignificant when compared with the piston area upon which said liquid operates in setting the brakes.

It is evident that this brake system is comparatively noiseless, since there is no discharge externally or into the air, as occurs in the vacuum and air brake systems now in use and in which the exhaust from such systems is very audible.

The means for operating brakes under my system is, as has before been stated, by a permanently closed system, there being no communication whatever with the atmosphere; hence it is noiseless as regards exhaust.

My improved system is applicable to steam railway cars, in which case each car may be supplied with vacuum and pressure reservoirs while a single lever system to the locomotive cab will enable all of the brakes to be readily operated by a single lever.

What I claim is—

1. An apparatus for operating brakes consisting of a permanently closed system, or a system which has no communication with the atmosphere, and which is adapted to contain an operating liquid, said system comprising two chambers into one of which the liquid is to be forced under pressure and the other of which is to serve normally as a vacuum chamber, a liquid forcing pump or device, a brake cylinder, connections between said liquid containing or pressure chamber and said vacuum chamber and said pump and brake cylinder, and a valve which may be turned to connect said liquid containing or pressure chamber with said brake cylinder, or to connect the latter with said vacuum chamber, and which valve also serves as a means for opening a communication between said pump and said liquid containing or pressure chamber and said vacuum chamber.

2. The herein described brake apparatus comprising the combination with a brake cylinder provided with a piston which is to be connected with the brake beam, of two vessels or chambers adapted, respectively, for pressure and vacuum service, and pipes leading from each of said vessels or chambers to the said brake cylinder, a liquid forcing device or pump, suitable connections between said pump, brake cylinder and pressure and vacuum vessels or chambers, a valve adapted to interconnect either of said vessels or chambers with said brake cylinder, the entire system comprising the above-named elements being permanently closed so as to have no communication with the atmosphere.

3. The herein described apparatus for operating brakes comprising a permanently closed system, or a system which has no communication with the atmosphere, and which is adapted to contain an operating liquid, said system consisting of the combination with a brake cylinder, and a piston therein and which piston is to be connected with the brake, of two vessels or chambers for pressure and vacuum service, respectively, means for connecting either of said vessels with said brake cylinder, a liquid forcing device, and means whereby said liquid forcing device may be placed in communication with said brake cylinder, and also with said vacuum and pressure vessels or chambers.

4. The combination with a car axle, of a shaft operatively connected with said car axle to be rotated thereby, a pump provided with a piston operatively connected with said shaft, a brake cylinder provided with a suitable piston to be connected to the brake beam, vacuum and pressure chambers or vessels having suitable connections with said brake cylinder and with said pump, and a valve which may be turned to connect said vacuum and pressure chambers with each other, through said pump, or to connect said pressure cylinder with said brake cylinder, or to connect the latter with said vacuum chamber or vessel, the entire system comprising the above-named elements being permanently closed so as to have no communication with the atmosphere.

In testimony whereof I affix my signature in presence of two witnesses.

NATHANIEL LOMBARD.

Witnesses:
HENRY A. CLARK,
H. E. LODGE.